United States Patent
Svedevall et al.

(10) Patent No.: US 8,731,557 B2
(45) Date of Patent: May 20, 2014

(54) INTER-PLMN HANDOVER IN A SHARED RADIO NETWORK

(75) Inventors: Sofia Svedevall, Linköping (SE); Thomas Walldeen, Linköping (SE); Pär Gustavsson, Linköping (SE); Bo Ehrenholm, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 634 days.

(21) Appl. No.: 12/991,269

(22) PCT Filed: May 22, 2008

(86) PCT No.: PCT/SE2008/050604
§ 371 (c)(1),
(2), (4) Date: Nov. 5, 2010

(87) PCT Pub. No.: WO2009/142562
PCT Pub. Date: Nov. 26, 2009

(65) Prior Publication Data
US 2011/0065436 A1 Mar. 17, 2011

(51) Int. Cl.
*H04W 36/14* (2009.01)

(52) U.S. Cl.
USPC ........... 455/436; 455/439; 455/440; 455/453; 455/435.1; 455/435.2

(58) Field of Classification Search
CPC ..... H04W 36/14; H04W 36/30; H04W 88/06; H04W 361/0066
USPC ......... 455/436, 437, 438, 439, 442, 443, 444, 455/445, 446, 453, 435.1–435.3; 370/331, 370/332
See application file for complete search history.

(56) References Cited

U.S. PATENT DOCUMENTS 6,266,531 B1 7/2001 Zadeh et al.
7,830,853 B2 * 11/2010 Abrahamson et al. ........ 370/342
(Continued)

FOREIGN PATENT DOCUMENTS

WO WO 03/017704 A1 2/2003
WO WO 2006/101426 A1 9/2006

OTHER PUBLICATIONS

International Search Report, PCT Application No. PCT/SE2008/050604, Feb. 26, 2009.
(Continued)

*Primary Examiner* — Allahyar Kasraian
(74) *Attorney, Agent, or Firm* — Myers Bigel Sibley & Sajovec, PA

(57) ABSTRACT

Handover control in a control node, said control node controlling allocation of radio resources in a first set of cells belonging to at least two different Public Land Mobile Networks, said first set of cells including at least a first subset of cells belonging to a first Public Land Mobile Network and a second subset of cells belonging to a second Public Land Mobile Network. Traffic load exceeding a predefined level is detected (504) in a first cell belonging to the first subset of cells. In response to said detecting, connections in the first cell are evaluated (507, 509) to find one or more connections which could be supported by radio resources in one or more cells in the second subset of cells having capacity for handling additional traffic load. Handover is ordered (506, 510) of at least one of said one or more connections to said one or more cells in the second subset of cells.

18 Claims, 6 Drawing Sheets

(56) References Cited

U.S. PATENT DOCUMENTS

| | | |
|---|---|---|
| 2006/0073831 A1 | 4/2006 | Guyot et al. |
| 2006/0128394 A1* | 6/2006 | Turina et al. ............... 455/453 |
| 2008/0049675 A1* | 2/2008 | Burgan et al. ............... 370/331 |
| 2008/0057955 A1* | 3/2008 | Choi-Grogan ............ 455/435.1 |
| 2008/0125126 A1* | 5/2008 | Fang et al. ................. 455/436 |
| 2009/0215447 A1* | 8/2009 | Catalano et al. .......... 455/432.1 |
| 2010/0142478 A1* | 6/2010 | Forssell et al. ............. 370/331 |
| 2010/0159922 A1* | 6/2010 | Tronc et al. ................. 455/427 |
| 2010/0330996 A1* | 12/2010 | Svedevall et al. ........... 455/436 |

OTHER PUBLICATIONS

International Preliminary Report on Patentability, PCT Application No. PCT/SE2008/050604, May 18, 2010.

3GPP TS 23.251 v. 7.0.0 (Jun. 2007), "3$^{rd}$ Generation Partnership Project; Technical Specification Group Services and System Aspects; Network Sharing Architecture and functional description (Release 7)"; Retrieved from the Internet: http://www.3gpp.org/ftp/Specs/html-info/23-series.htm.

Communication pursuant to Article 94(3) EPC, European Patent Application No. 08754000.1, Sep. 8, 2011.

Motorola: "Considerations on Network Sharing aspects", 3GPP Draft; GP-032618, 3$^{rd}$ Generation Partnership Project (3GPP), Mobile Competence Centre; 650, Route Des Lucioles, F-06921 Sofia-Antipolis Cedex; France; vol. TSG GERAN, no. Budapest; Nov. 12, 2003, 6 pp.

Ericsson et al.: "MOCN-RAN PS/CS coordination", 3GPP Draft; R3-050549, 3$^{rd}$ Generation Partnership Project (3GPP), Mobile Competence Centre; 650, Route Des Lucioles; F-06921 Sophia-Antipolis Cedex; France, vol. RAN WG3, no. Athens, Greece; May 4, 2005, 3 pp.

\* cited by examiner

INTER-PLMN HANDOVER IN A SHARED RADIO NETWORK

CROSS REFERENCE TO RELATED APPLICATION

This application is a 35 U.S.C. §371 national stage application of PCT International Application No. PCT/SE2008/050604, filed on 22 May 2008, the disclosure and content of which is incorporated by reference herein in its entirety. The above-referenced PCT International Application was published in the English language as International Publication No. WO 2009/142562 A1 on 26 Nov. 2009.

TECHNICAL FIELD

The present invention relates to method and arrangements in a cellular communication system. The invention more in particular relates to handover control in a control node of the cellular communication system.

BACKGROUND

Traditionally a GSM Public Land Mobile Communication Network is implemented using a core network, including core network nodes such as Mobile Services Switching Centers providing e.g. circuit switched services and Short Message Services, and a radio network, referred to as a GSM Base Station System (BSS), providing radio coverage for the Public Land Mobile Network. Each GSM Base Station System includes one or more Base Station Controllers each connected to and controlling a plurality of base transceiver stations (base stations) which each includes radio transmitter and receivers (transceivers) for providing radio communication in one or more cells.

More recently, radio network sharing has been implemented as a means to allow network operators reducing the deployment costs for cellular networks. In a scenario with a shared GSM radio network, i.e. a shared GSM base station system, the GSM base station system would provide radio coverage for two or more GSM Public Land Mobile Networks by providing radio communication in cells belonging to different GSM Public Land Mobile Networks. All cells belonging to a certain GSM Public Land Mobile Network can be regarded as a logical radio network for said network. This way, all but the resources dedicated to specific cells (each belonging to a single network), can be shared between said one or more GSM Public Land Mobile Networks.

Handover is a well known feature of cellular communication networks enabling a connection supported by radio resources (one or more channels) in a serving cell to be handed over to a new cell where radio resources are allocated for continued support of the connection. Different types of handovers can be distinguished based on what nodes are involved in the handover. Thus there are intra BSC handovers between cells for which the same base station controller handles resource allocation, inter BSC handover between cells where different base station controllers handle resource allocation in the serving and new cells and there is also inter PLMN handovers between cells belonging to different Public Land Mobile Networks. For inter BSC handovers and inter PLMN handovers, the base station controller of the serving cell needs to notify the core network (mobile services switching centre) that it would be desirable to perform handover and await confirmation that the handover may be performed prior to handover.

Handover is typically performed to enable continued communication as a mobile station moves from the coverage area of a serving cell into the coverage area of another cell. However, many GSM cellular network support Cell Load Sharing (CLS, see e.g. U.S. Pat. No. 6,266,531) where handover may be performed to distribute traffic load between cells. Thus, when a base station controller detects too high traffic load in a first cell, while there is spare capacity available in neighboring cells, the base station controller may order handover of connections in the first cell to neighboring cells having capacity for handling additional load and radio resources capable of supporting said connections. Cell Load Sharing is performed between cells belonging to the same Public Land Mobile Network and for which the same base station controller is responsible for resource allocation.

SUMMARY

An object of the present invention is to enable improved utilization of radio resources in a cellular communication system.

In a first aspect, the present invention relates to a method of handover control in a control node, said control node controlling allocation of radio resources in a first set of cells belonging to at least two different Public Land Mobile Networks, said first set of cells including at least a first subset of cells belonging to a first Public Land Mobile Network and a second subset of cells belonging to a second Public Land Mobile Network. Traffic load exceeding a predefined level is detected in a first cell belonging to the first subset of cells. In response to said detecting, connections in the first cell are evaluated to find one or more connections which could be supported by radio resources in one or more cells in the second subset of cells having capacity for handling additional traffic load. Handover is ordered of at least one of said one or more connections to said one or more cells in the second subset of cells.

In a second aspect, the present invention relates to a control node (e.g. a base station controller or a radio network controller), for controlling allocation of radio resources in a first set of cells belonging to at least two different Public Land Mobile Networks, said first set of cells including at least a first subset of cells belonging to a first Public Land Mobile Network and a second subset of cells belonging to a second Public Land Mobile Network. Detecting means in the control node are arranged for detecting traffic load exceeding a predefined level in a first cell belonging to the first subset of cells. Evaluating means in the control node are arranged for evaluating, when the traffic load exceeds the predefined level, connections in the first cell to find one or more connections which could be supported by radio resources in one or more cells in the second subset of cells having capacity for handling additional traffic load. Handover means in the control node are arranged for ordering handover of at least one of said one or more connections to said one or more cells in the second set of cells.

In yet another aspect, the present invention is a computer program embodied on a computer-readable medium and executable by digital data processing circuitry to perform the method recited above.

An advantage afforded by the invention is that it enables improved utilization of radio resources in a cellular communication system.

The invention will now be described in more detail with reference to exemplary embodiments thereof and also with reference to the accompanying drawings.

DETAILED DESCRIPTION

Figure 1:
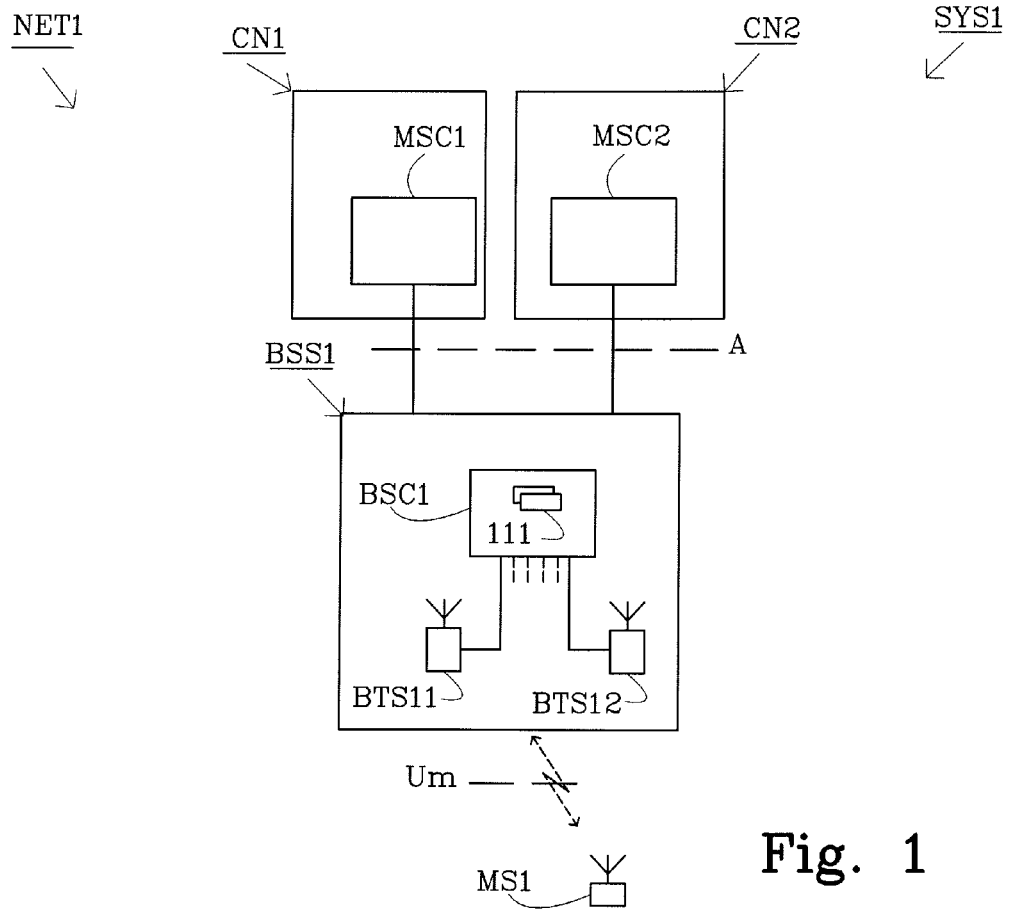
FIG. 1 is a schematic view of a non-limiting example of a communication system in which the present invention may be employed.

FIG. 1 illustrates a non-limiting example of a communication system SYS1 in which the present invention may be employed. The exemplary communication system SYS1 illustrated in FIG. 1 is a GSM System. The communication system SYS1 includes a cellular network infrastructure portion NET1 and mobile stations (MS), alternatively referred to as user equipment (UE).

Figure 4:
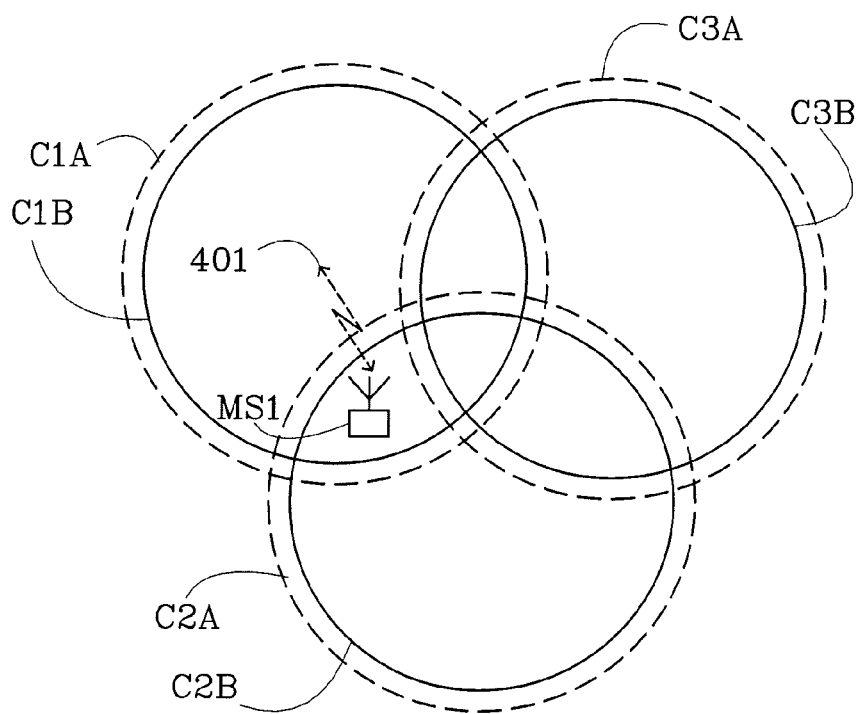
FIG. 4 is a view schematically illustrating cells belonging to different Public Land Mobile Networks.

The exemplary cellular network infrastructure portion NET1 of FIG. 1 includes a first core network CN1, a second core network CN2 and a shared radio access network in the form of a GSM Base Station System (BSS) BSS1, referred to as base station system BSS1 in the following. The exemplary cellular network infrastructure NET1 provides resources for implementing two Public Land Mobile Networks, wherein the first core network CN1 provides core network resources for a first Public Land Mobile Network, the second core network CN2 provides core network resources for a second Public Land Mobile Network and the base station system BSS1 provides radio coverage for both the first and the second Public Land Mobile Networks. The radio base station system BSS1 provides radio coverage in a first set of cells, said first set of cells including a first subset of cells belonging to the first Public Land Mobile Network and a second subset of cells belonging to the second Public Land Mobile Network. The first and second subset of cells can be regarded as two logical radio networks associated with the first and second Public Land Mobile Networks respectively. FIG. 4 schematically illustrates cells C1A-C3A (represented by dashed circles) belonging to the first subset of cells and cells C1B-C3B (represented by solid circles) belonging to the second subset of cells. In this example scenario, each pair of cells, e.g. C1A-C1B and C2A-C2B, are configured as twin cells with essentially the same coverage area but other configurations are of course possible.

The first core network CN1 includes a first Mobile Services Switching Center (MSC) node MSC1 while the second core network CN2 includes a second Mobile Services Switching Center node MSC2. The Mobile Services Switching Centers MSC1 and MSC2 provide e.g. circuit-switched services and Short Message Services (SMS) for their respective Public Land Mobile Network.

The GSM Base Station System BSS1, provide radio communication between the cellular network infrastructure portion NET1 and mobile stations, such as mobile station MS1 in FIG. 1 using GSM/EDGE radio access technology which is well known to a person skilled in the art. Communication between mobile stations and the base station system BSS1 occurs over a radio interface referred to as the Um interface. The details of the Um-interface are specified in the 24-, 44- and 45-series of 3GPP Technical Specifications.

The base station system BSS1 includes one or more base station controllers (BSCs). For sake of simplicity, the base station system BSS1 of FIG. 1 is shown with only one base station controller BSC1. Each base station controller is typically connected to and controls a plurality of base transceiver stations (BTSs), e.g. first base transceiver station BTS11 and second base transceiver station BTS12 in FIG. 1. The base station system BSS1 is connected to the mobile services switching centers MSC1 and MSC2 over an interface referred to as the A interface.

By using Shared radio networks, such as the base station system BSS1 in FIG. 1, network operators may share the heavy deployment costs for cellular networks. By using different logical radio networks it is possible to share BSS network hardware between two or more different Public Land Mobile Networks. In the context of the exemplary system of FIG. 1, where the base station system BSS1 is a radio network shared between the first and second Public Land Mobile Networks, this means that the base station controller BSC1 and the base station transceiver stations BTS11 and BTS12 are configured to support cells belonging to two different Public Land Mobile Networks. However, parts of the base transceiver station hardware are associated with specific cells (e.g. cell C1A or cell C1B) and thus dedicated per logical radio network.

Figure 2:
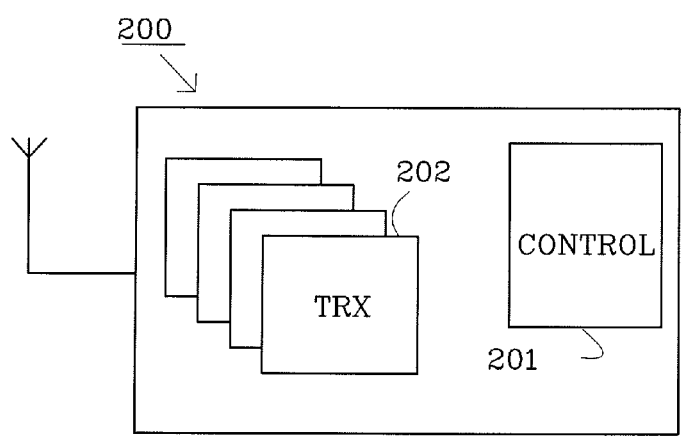
FIG. 2 is a schematic block diagram illustrating a base transceiver station.

FIG. 2 schematically illustrates an exemplary embodiment of a base transceiver station 200 such as the first base transceiver station BTS11. The base transceiver station 200 comprises a control processor 201 and a plurality of transceivers 202. The control processor 201 handles overall control and common functions in the base transceiver station BTS11. Each transceiver 202 handles downlink radio transmission and uplink radio reception according to the GSM standards. One or more transceivers 202 are configured for radio communication in each cell, and are thus also dedicated per logical radio network. The transceivers provide radio resources in the form of radio channels which in GSM are defined by time slot and a sequence of radio frequencies (possibly a single radio frequency) in up and downlink directions.

The inventors of the present invention have identified that in a shared radio network, such as base station system BSS1 of FIG. 1, there is a potential to improve the utilization of radio resources, and hence enable even further cost savings, by enabling traffic load sharing between cells belonging to different Public Land Mobile Networks. This allows the cells in each Public Land Mobile Network to be dimensioned for less traffic load, since spare capacity in cells in other Public Land Mobile Networks covering the same area can be used to handle traffic load peaks. The cost savings/radio resource utilization further increases with the number of Public Land Mobile Networks which are sharing a radio access network.

Figure 3:
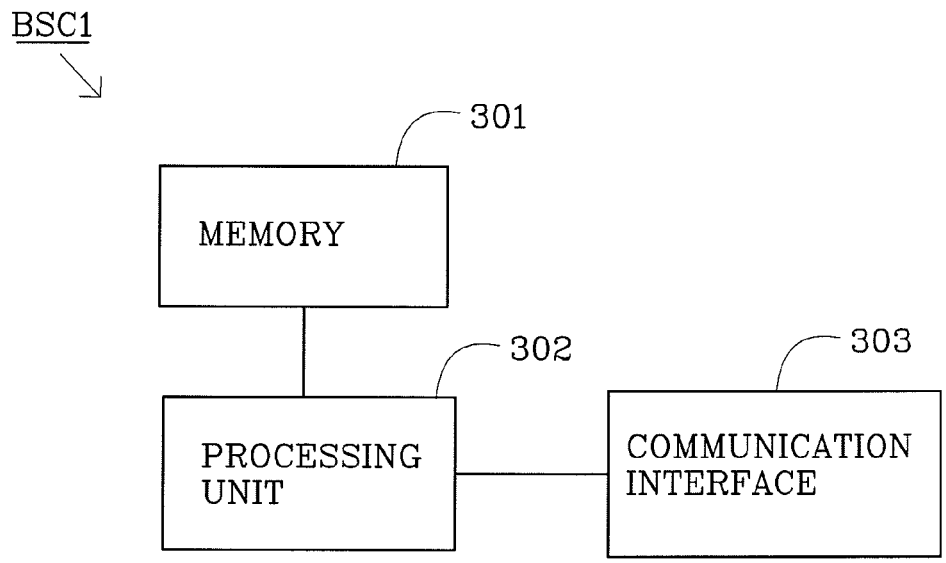
FIG. 3 is a schematic block diagram illustrating a base station controller.

FIG. 3 schematically illustrates an exemplary embodiment of the base station controller BSC1. The base station controller BSC1 is responsible for allocation of radio resources, i.e. radio channels, in the first set of cells including cells C1A-C3A and C1B-C3B.

The base station controller BSC1 comprises a memory unit 301, a processing unit 302 and a communications interface 303.

The memory unit 301 is arranged to store data associated with each connection which is supported by resources in any one of the cells in the first set of cells.

The processing unit 302 is arranged to perform processing in the base station controller BSC1 including monitoring of connections and making decision on handovers of connections supported by radio resources in the first set of cells.

The communication interface 303 connects the base station controller BSC1 to the mobile services switching centers MSC1 and MSC2 and the base transceiver stations BTS11 and BTS12 and enables communication, including control signaling, with the respective other node.

Figure 5A:
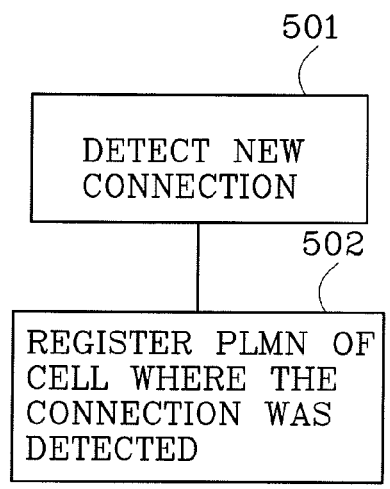
FIG. 5A-5C are flow diagrams illustrating a first exemplary embodiment of a method for handover control according to the invention.
Figure 5B:
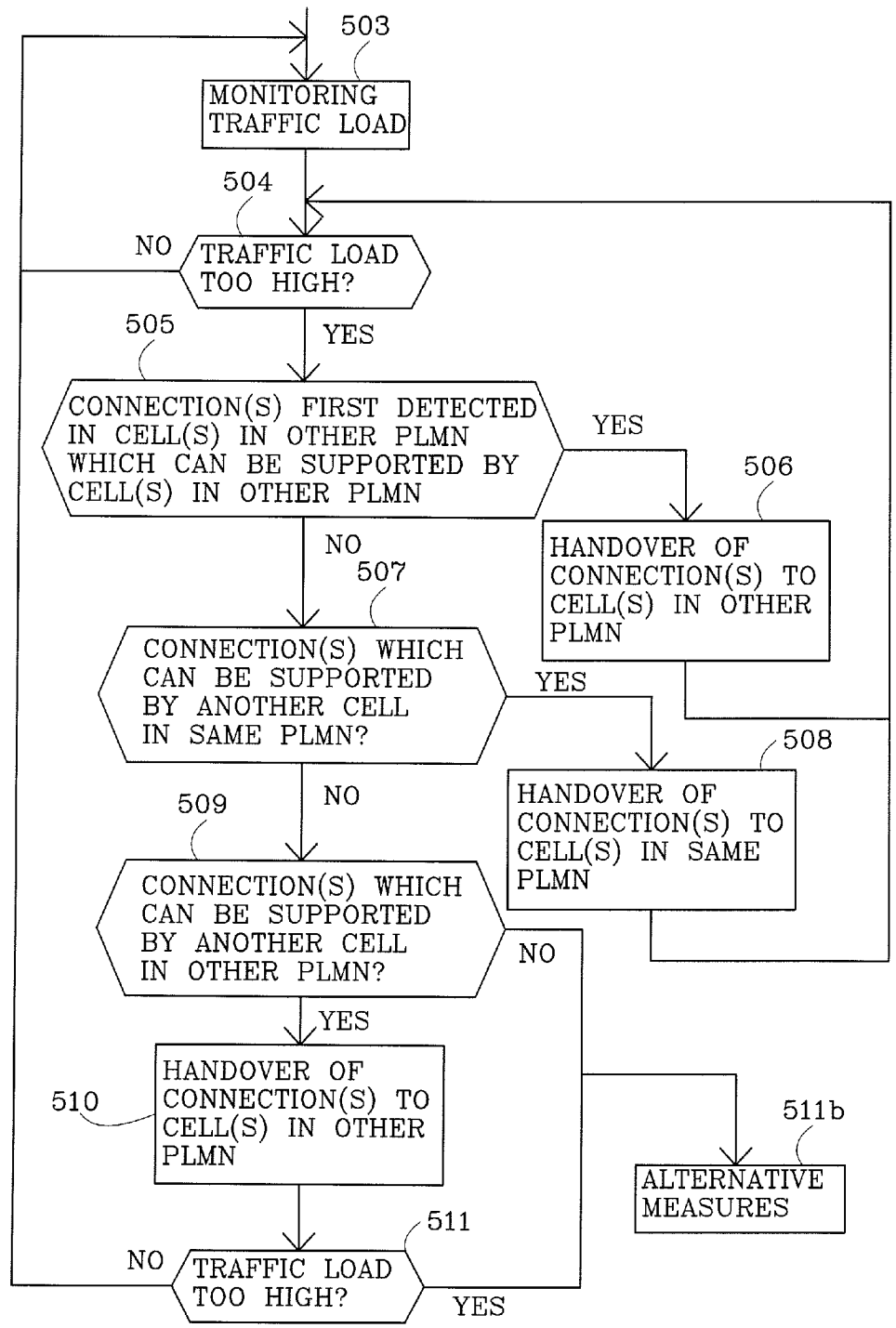
Figure 5C:
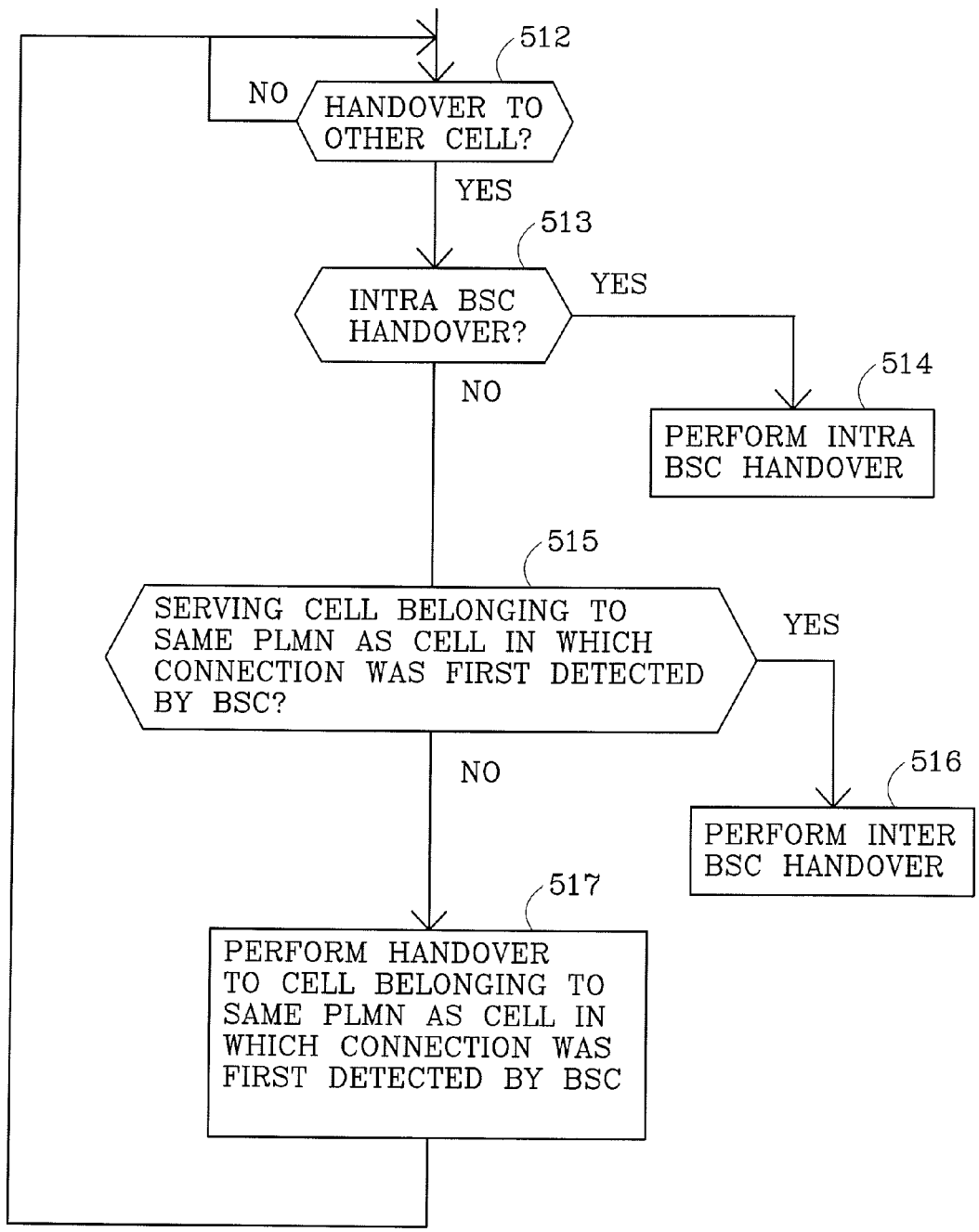

FIG. 5A-5C illustrates a first exemplary embodiment of a method according to the invention for handover control employed by the base station controller BSC1 in FIGS. 1 and 3.

FIG. 5A illustrates processing by the processing unit 302 in the base station controller BSC1 relating to new connections in the first set of cells.

At step 501 in FIG. 5A, a new connection is detected by the base station controller BSC1. The new connection may be detected as a result of initial call setup in one of the cells in the first set of cells or as a result of inter BSC handover (i.e. handover from a cell under control of another BSC) to a cell in the first set of cells.

At step 502, data indicative of the Public Land Mobile Network to which the cell belongs in which the new connection was first detected by the base station controller BSC1 is registered as initial detection data in the memory 301.

Figure 6:
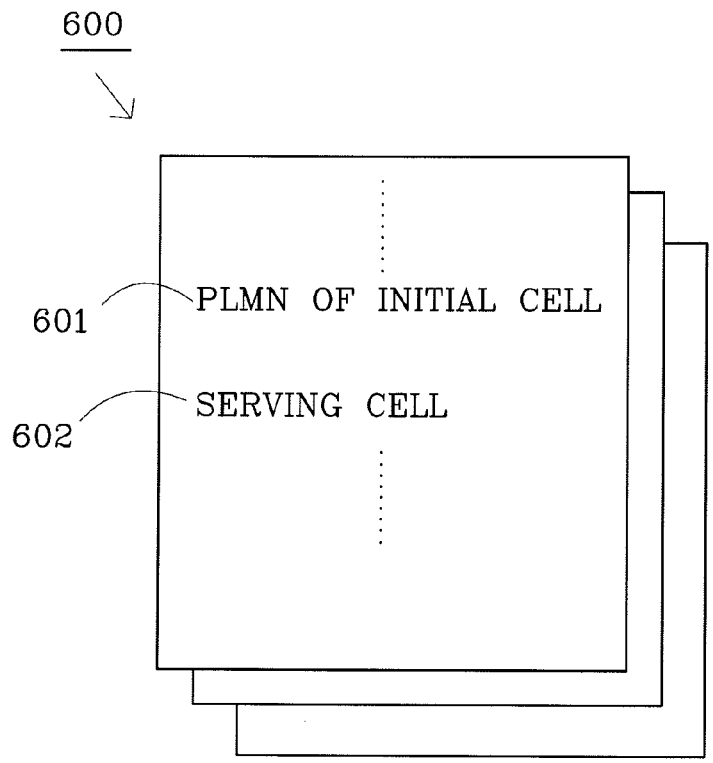
FIG. 6 is a schematic illustration of an exemplary data structure which can be used to represent data related to connections in a base station controller.

In this exemplary embodiment, the base station controller BSC1 uses a data structure as schematically illustrated in FIG. 6 for representing data related to connections for which the base station controller BSC1 controls allocation of radio resources, i.e. connections in any one of the cells in the first set of cells. Each established connection is represented by a MS context record 600 in the base station controller. Each MS context record includes an initial detection data field 601 indicating the Public Land Mobile Network where the connection was first detected by the base station controller BSC1 and also includes a field 602 indicating the current serving cell.

Figure 7:
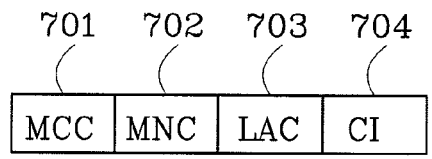
FIG. 7 is a block diagram illustrating the format of GSM Cell Global Identity (CGI).

According to the GSM specifications, each cell is assigned a Cell Global Identity (CGI). As illustrated in FIG. 7, the CGI consist of Mobile Country Code (MCC) 701, Mobile Network Code (MNC) 702, Location Area Code (LAC) 703 and Cell Identity (CI) 704. The initial detection data field 601 could e.g. be provided as Mobile Network Code or as a combination of Mobile Country Code and Mobile Network Code for the cell in which a connection was detected at step 501.

FIG. 5B illustrates processing by the processing unit 302 in the base station controller BSC1 relating to traffic load control for cells in the first set of cells.

At step 503, the base station controller BSC1 monitors the traffic load of a first cell, e.g. cell C1A of FIG. 4 belonging to the first subset of cells, i.e. belonging to the first Public Land Mobile Network. If the traffic load is below a predefined level (an alternative NO at step 504) in the first cell, the base station controller BSC1 continues to monitor the traffic load at step 503. The traffic load may e.g. be measured as the ratio of available radio channels in the first cell to the total number of radio channels configured for the first cell.

If the traffic load exceeds the predefined level in the first cell (an alternative YES at step 504), the base station controller BSC1 evaluates, at step 505, connections in the first cell to find one or more connections whose initial detection data indicate the second Public Land Mobile Network (i.e. that the connections were first detected in cells belonging to the second subset of cells), and which could be supported by radio resources in one or more cells in the second subset of cells having capacity for handling additional traffic load.

If one or more connections were found at evaluating step 505 (an alternative YES at step 505), handover of at least one of said one or more connections found in step 505 is ordered by the base station controller BSC1 to said one or more other cells in the second subset of cells at step 506. Processing then continues at step 504 to check if the traffic load is still too high.

If no connection was found at step 505 (an alternative NO at step 505), the base station controller BSC1 performs an additional evaluation step 507 where connections in the first cell are evaluated to find one or more connections which could be supported by radio resources in one or more other cells in the first subset of cells (i.e. belonging to the first Public Land Mobile Network) having capacity for handling additional traffic load.

If one or more connections were found at step 507 (an alternative YES at step 507), handover of at least one of said one or more connections found in step 507 is ordered by the base station controller BSC1 to said one or more other cells in the first subset of cells at step 508. Processing then continues at step 504 to check if the traffic load is still too high.

If no connection was found at step 507 (an alternative NO at step 507), the base station controller BSC1 evaluates in step 509 connections (regardless of their initial detection data) in the first cell to find one or more connections which could be supported by radio resources in one or more cells in the second subset of cells having capacity for handling additional traffic load.

If one or more connections were found at step 509 (an alternative YES at step 509), handover of at least one of said one or more connections found in step 509 is ordered by the base station controller BSC1 to said one or more other cells in the second subset of cells at step 510. Processing then continues at step 511 to check if the traffic load is still too high.

If the traffic load is acceptable (an alternative NO at step 511), processing continues at step 503 where the monitoring of the traffic load in the first cell is continued.

If no connection was found at step 509 (an alternative NO at step 509) or the traffic load was still considered too high at step 511 (an alternative YES at step 511), processing continues at step 511b where alternative measures to reduce the traffic load, or at least avoid further increase of traffic load, is performed for the first cell. Such measures may include e.g.:

- changing from full rate to half rate traffic channels for at least some connections;
- only allowing setup of new connections for users having high priority; and/or
- disconnecting connections for users having low priority.

Whether radio resources in another cell (either in the first or second subset of cells) is capable of supporting a connection currently supported by resources in the first cell can be assessed from signal strength measurements for the cell reported by the associated mobile station to the base station controller BSC1. Typically mobile stations operating in the first cell would be requested to measure signal strengths of cells belonging to both the first and the second Public Land Mobile Network. However, since the cells of the two Public Land Mobile Networks in this example scenario are configured as twin cells with essentially the same coverage area, it would also be possible to have the mobile station measure only signal strengths of cells belonging to the same Public Land Mobile Network as the first cell, and then rely on these measurements as relevant also for the respective twin cell in the other Public Land Mobile Network. This way the amount of signal strength measurements and associated measurement report signaling by mobile stations could be reduced.

When performing evaluation step 507, i.e. looking for connections to handover to another cell belonging to the same Public Land Mobile Network as the first cell, the threshold values used in evaluating reported signal strength measurements are preferably adjusted so as to effectively reduce the coverage area of the first cell and increase the coverage area of neighboring cells to the first cell in the first subset of cells e.g. as described in U.S. Pat. No. 5,241,685.

Whether the other cell has capacity for handling additional traffic load can be determined by checking if a measure of traffic load (e.g. ratio of available radio channels in the other cell to the total number of radio channels configured for the other cell) is below a predetermined threshold value.

The number of connections for which handover is possible to perform in steps 506, 508 and 510 depends of course on the number of connections found at the respective associated evaluation steps 505, 507 and 509. Preferably, at each step 506, 508 and 510, handover is performed of as many connections as needed to reduce the traffic load in the first cell to an acceptable level (below the predefined level). Also, please note that in the flow diagram of FIG. 5B, if any one of steps 505 and 507 and 509 are revisited as a consequence of not enough connections having been handed over from the first cell to other cells at steps 506, 508 and 510, no further evaluation in the respective step is necessary and processing immediately continues with the next step following the "NO" alternative.

FIG. 5C illustrates processing performed by the processing unit 302 in the base station controller BSC1 relating to handovers of connections due to mobile station movements (roaming).

At step 512 the base station controller BSC1 monitors whether handover needs to be performed for a first connection from a serving cell in the first set of cells to another cell.

If no need for handover is detected at step 512 (an alternative NO at step 512), the base station controller BSC1 continues to monitor the need for handover of the connection at step 512.

If a need for handover to an other cell is detected (an alternative YES at step 512), the base station controller BSC1 checks in step 513 whether the detected need for handover relates to an intra BSC handover, i.e. a handover to another cell in the first set of cells for which the base station controller BSC1 controls allocation of radio resources, or an inter BSC handover, i.e. a handover to a cell for which another base station controller controls allocation of radio resources.

If the detected need for handover relates to an intra BSC handover (an alternative YES at step 513), the base station controller BSC1 can allocate requested resources for the connection in the new cell and order handover of the connection at step 514.

If the detected need for handover relates to handover to a cell under control of another base station controller (an alternative NO at step 513), the base station controller BSC1 checks in step 515 whether the serving cell belongs to the same Public Land Mobile Network as the cell in which the connection was first detected by the base station controller BSC1.

If the serving cell belongs to the same Public Land Mobile Network as the cell in which the connection was first detected by the base station controller BSC1 (an alternative YES at step 515), the base station controller BSC1 initiates, at step 516, inter BSC handover to the cell under the control of the other base station controller by signaling the need for handover to the mobile services switching centre of the Public Land Mobile Network to which the serving cell belongs.

If the serving cell belongs to a different Public Land Mobile Network than the cell in which the connection was first detected by the base station controller BSC1 (an alternative NO at step 515, the base station controller BSC1 in this exemplary embodiment, orders handover to a cell belonging to the same Public Land Mobile Network as the cell in which the connection was first detected by the base station controller BSC1.

Figure 8:
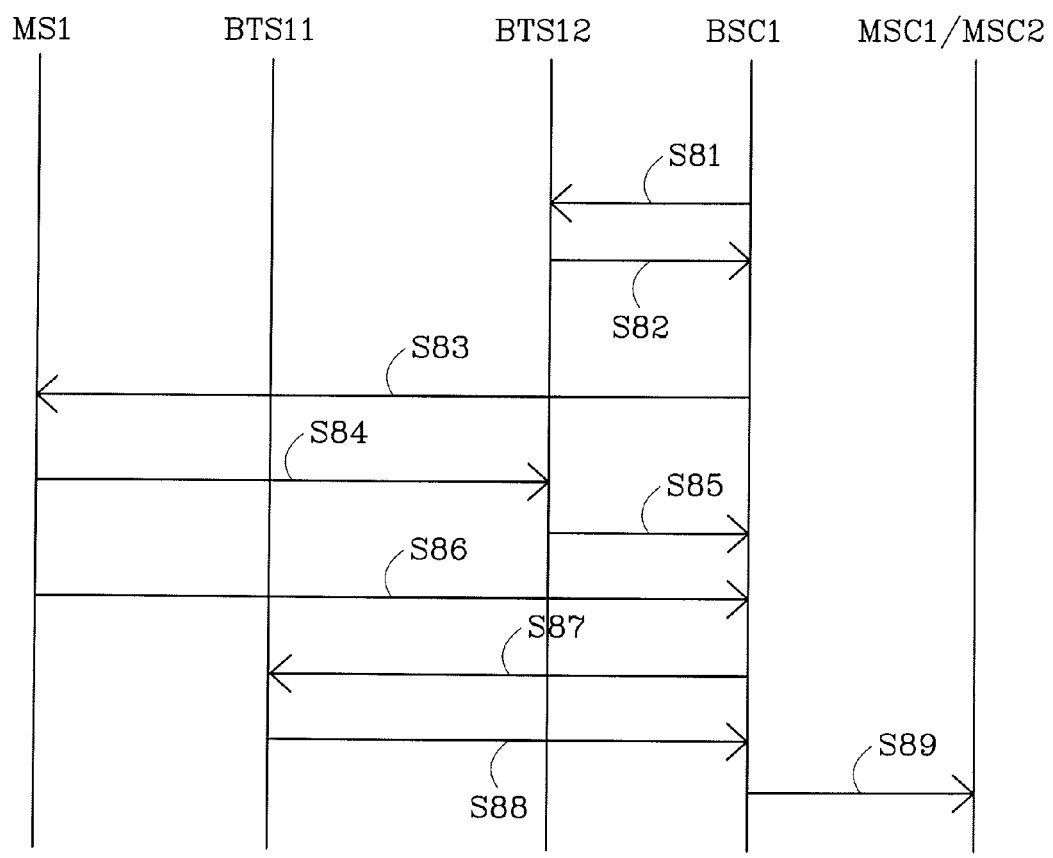
FIG. 8 is a signal sequence diagram illustrating an example scenario of handover of a connection between cells C1A and Cell C2B in FIG. 4.

FIG. 8 schematically illustrates a signaling sequence in an example scenario where handover of a connection 401 associated with mobile station MS1 operating in cell C1A, which is served by base transceiver station BTS11, is performed to cell C2B, which is served by base transceiver station BTS12. The signal sequence may serve as an illustration both of a situation where handover is triggered at step 506 of FIG. 5B, in a situation where the connections 401 initial detection data indicates that the connection was first detected by the base station controller BSC1 in a cell in the second subset of cells, as well as a situation where handover is triggered at step 510 of FIG. 5B, in a situation where the connections 401 initial detection data indicates that the connection was first detected by the base station controller BSC1 in a cell in the first subset of cells.

Once the base station controller BSC1 decides to perform handover of the connection 401 (at step 506 or 510) from cell C1A to cell C2B, the base station controller BSC1 sends a signal S81 to the second base transceiver station BTS12 to activate a traffic channel in cell C2B for supporting the connection in cell C2B. The second base transceiver station BTS12 activates the requested traffic channel and sends an acknowledge signal S82 to the base station controller BSC1. Once the new channel has been activated, the base station controller BSC1 sends a 3GPP TS 44.018 HANDOVER COMMAND signal S83 to the mobile station MS1 with information about frequency, time slot and required output power. The HANDOVER COMMAND signal S83 is sent via the first base transceiver station BTS11/cell C1A. The mobile station MS1 tunes to the new frequency and transmits HANDOVER ACCESS bursts S84 to the second base transceiver station BTS12/cell C2B. The second base transceiver station BTS12 notifies the base station controller BSC1 of the detected access bursts in signal S85. Once communication with the second base transceiver station BTS12 has been established in cell C2B, the mobile station MS1 sends a 3GPP TS 44.018 HANDOVER COMPLETE signal S86 to the base station controller BSC1 via the second base transceiver station BTS12.

The base station controller BSC1 sends a signal S87 to the first base transceiver station BTS11 ordering it to deactivate the channel previously used to support the connection 401 with the mobile station MS1 in cell C1A. After deactivating the channel as ordered, the first base transceiver station BTS11 transmits an acknowledgement signal S88 to the base station controller BSC1. The base station controller BSC1 finally transmits a 3GPP TS 48.008 HANDOVER PERFORMED signal S89 to the mobile service switching center, MSC1 or MSC2, associated with the Public Land Mobile Network indicated by the initial detection data of the connection. Thus, if the connection with the mobile station MS1 was first detected by the base station controller BSC1 in a cell belonging to the first subset of cells (i.e. a cell belonging to the first Public Land Mobile Network), the initial detection data of the connection would indicate the first Public Land Mobile Network and the HANDOVER PERFORMED signal S89 would be transmitted to the first mobile services switching centre MSC1 in the first core network CN1. Otherwise, i.e. if the connection with the mobile station MS1 was first detected by the base station controller BSC1 in a cell belonging to the second subset of cells (i.e. a cell belonging to the second Public Land Mobile Network), the initial detection data of the connection would indicate the second Public Land Mobile Network and the HANDOVER PERFORMED signal S89 would be transmitted to the second mobile services switching centre MSC2 in the second core network CN2.

In the first exemplary embodiments of a method for handover control and a control node (in this exemplary embodiment in the form of a base station controller BSC1) according to the invention, the processing steps 501-517 illustrated in FIG. 5A-5C and the processing unit 302 in FIG. 6 are implemented using digital data processing circuitry in the form of one or more conventional programmable processors 111 in the base station controller.

Apart from the exemplary first embodiments of the invention disclosed above, there are several ways of providing rearrangements, modifications and substitutions of the above disclosed embodiment resulting in additional embodiments of the invention.

In the first exemplary embodiment of the invention, handover of connections from the first cell (belonging to the first Public Land Mobile Network) to cells in the second subset of cells (i.e. cells belonging to the second Public Land Mobile Network) at steps 506 or 510 are ordered by the base station controller BSC1 without prior notification to a core network node (either mobile switching center MSC1 or MSC2) that it would be desirable to perform said handover. This allows the core network of the respective Public Land Mobile Network to retain communication session control (e.g. for charging, service continuity etc) also when handover due to high traffic load is performed between cells belonging to different Public Land Mobile Networks in the shared radio network.

In other embodiments of the invention, the base station controller BSC1 could be arranged to initiate full inter PLMN handover by informing a core network node that it would be desirable to perform handover and then wait for confirmation that handover may be performed before proceeding with the handover. This however implies that communication session control is transferred to the core network of another Public Land Mobile Network when performing handover due to high traffic load between cells belonging to different Public Land Mobile Networks in the shared radio network. It would also cause extra signaling load in both mobile switching centers MSC1 and MSC2, especially in situations where the shared radio network is dimensioned to rely heavily on traffic load sharing between the Public Land Mobile Networks.

There are several alternatives for how evaluation of connections in a first cell with high traffic load is performed. In the first embodiment of the invention there are two steps, 505 and 509, where connections in the first cell are evaluated to find one or more connections which could be supported by radio resources in one or more cells in the second subset of cells, i.e. in cells belonging to another Public Land Mobile Network than the first cell, having capacity for handling additional traffic load.

Step 505 is an example of evaluation performed according to a predetermined rule which discriminates between connections whose initial data indicate the first Public Land Mobile Network, i.e. the Public Land Mobile Network to which the first cell belongs, and connections whose initial data indicate the second Public Land Mobile Network, i.e. a different Public Land Mobile Network than the network to which the first cell belongs. The predetermined rule applied in step 505, i.e. to only consider connections whose initial detection data indicate the second Public Land Mobile Network, is further an example wherein said predetermined rule prioritizes finding connections whose initial detection data indicate the second Public Land Mobile Network, i.e. another Public Land Mobile Network than the network to which the first cell belongs, over connections whose initial detection data indicate the first Public Land Mobile Network, i.e. the network to which the first cell belongs. Step 509 is an example of evaluation where evaluation is performed without any kind of discrimination between connections based on their initial detection data. Alternative embodiments of the invention may use only one of steps 505 and step 509.

Typically it is desirable to also evaluate connections in the first cell to find one or more connections which could be supported by radio resources in one or more other cells belonging to the same Public Land Mobile Network as the first cell having capacity for handling additional traffic load. Such evaluation to find connections which could be handed over to other cells belonging to the same Public Land Mobile Network as the first cell could discriminate between connections based on the initial detection data of the connections, e.g. to primarily consider connections whose initial detection data indicate that the connection was first detected by the base station controller BSC1 in a cell belonging to the same Public Land Mobile Network as the first cell, but could also be done without discriminating between connections based on the initial detection data. It is further also possible to e.g. only consider connections for handover to a twin cell (e.g. cell C1B is a twin cell to cell C1A in FIG. 1) in a different Public Land Mobile Network covering essentially the same area as the first cell.

Out of the total traffic handling capacity of certain cell, a certain amount (e.g. 60%) could be reserved for connections whose initial detection data indicates that they were first detected in a cell belonging to the same Public Land Mobile Network as said certain cell and/or the amount of maximum traffic capacity allowed to be used for connections whose initial detection data indicates that they were first detected in cells belonging to other Public Land Mobile Networks could be limited per other Public Land Mobile Network, e.g. upto 30% of the traffic handling capacity of cell C2B belonging to the second Public Land Mobile Network could be used for connections whose initial detection data indicates that they were first detected by the base station controller in cells belonging to the first Public Land Mobile Network. When deciding whether the traffic load in the first cell exceeds the predefined threshold value and/or whether another cell has capacity for handling additional traffic load and hence is capable to being the target for handovers from the first cell, such reservations/limitations could be considered.

In the first exemplary embodiment of the invention, the HANDOVER PERFORMED signal S89 of FIG. 8 includes the identity of the new cell (i.e. cell C2B) regardless of the initial detection data of the connection 401. In alternative embodiments, in a situation where the initial detection data of the connection 401 indicates that the connection 401 was first detected in a cell in the first subset of cells (i.e. belonging to the first Public Land Mobile Network), the HANDOVER PERFORMED signal S89 could instead include the identity of cell C2A, i.e. a twin cell covering essentially the same area as the cell to which the connection 401 is handed over, but belonging to the same Public Land Mobile Network as the cell in which the connection 401 was first detected by the base station controller BSC1. In other alternative embodiments of the invention, the base station controller BSC1 could refrain from sending the HANDOVER PERFORMED signal S89 in connection with handovers triggered at step 510.

There are several alternative ways of providing initial detection data indicative of the Public Land Mobile Network to which the cell belongs in which a connection was initially detected by the base station controller BSC1. For example, initial detection data could include at least one of:

Public Land Mobile Network identity of the cell in which the connection was detected;
identity of the cell in which the connection was detected;
identity of a core network node uniquely associated with the Public Land Mobile Network to which the cell in which the connection was detected belongs.

Figure 9:
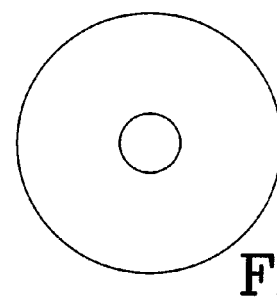
FIG. 9 shows an example of a computer-readable medium

Different embodiments of methods and apparatuses according to the invention may all be implemented the same way as for the first exemplary embodiment, i.e. utilizing digital data processing circuitry in the form of one or more conventional programmable processors to perform the different processing steps of the methods. However, any digital data processing circuitry capable of performing said processing could be used, e.g. an ASIC, a discrete logic circuit etc. It is also possible to use a combination of different kinds of digital data processing circuitry. In the first exemplary embodiments of the invention, as in other embodiments of the invention using programmable devices, the controlling computer program (software) is embodied as machine-readable instructions stored on some kind of computer-readable medium such as RAM, a hard drive, electronic read-only memory, an optical storage device (e.g. a CD-ROM as schematically illustrated in FIG. 9) etc. Programmable devices performing processing according to the invention, can be dedicated to this task or used also for processing relating to other tasks.

Even though the invention in the exemplary embodiments disclosed above has been applied in the context of a cellular shared radio access network in the form of a GSM base station system, the invention is also generally applicable in other types of cellular shared radio access networks (e.g. a shared UMTS Radio Access Network (UTRAN)) including at least one control node (e.g. an UTRAN radio network controller) controlling radio resource allocation in cells belonging to more than one Public Land Mobile Networks.

The invention claimed is:

1. A method of handover control in a control node, said control node controlling allocation of radio resources in a first set of cells belonging to at least two different Public Land Mobile Networks, said first set of cells including at least a first subset of cells belonging to a first Public Land Mobile Network and a second subset of cells belonging to a second Public Land Mobile Network, wherein the method comprises:

detecting traffic load exceeding a predefined level in a first cell belonging to the first subset of cells;

determining, in response to said detecting the traffic load exceeding the predefined level in the first cell belonging to the first subset of cells, if there are one or more connections whose initial detection data indicated being in the second subset of cells belonging to the second Public Land Mobile Network, which could be supported by radio resources in one or more cells in the second subset of cells belonging to the second Public Land Mobile Network having capacity for handling additional traffic load to support the one or more connections in the first cell;

ordering, in response to the determining that there are one or more cells in the second subset of cells having capacity for handling additional traffic load, handover of at least one of said one or more connections to said one or more cells in the second subset of cells belonging to the second Public Land Mobile Network;

checking, if there are a second one or more connections whose initial detection data indicated being in the first subset of cells belonging to the first Public Land Mobile Network, and if there are radio resources in at least one cell, different from the first cell, of the first subset of cells belonging to the first Public Land Mobile Network to support the second one or more connections in the first cell; and responsive to the checking that there are radio resources in at least one cell of the first subset of cells belonging to the first Public Land Mobile Network to support the second one or more connections in the first cell, ordering a handover of at least one of the second one or more connections to a cell in the first set of cells which belongs to the first Public Land Mobile Network.

2. A method according to claim 1, wherein in response to the control node detecting a new connection, the control node registers in memory initial detection data associated with the new connection and indicative of the first Public Land Mobile Network to which the cell belongs in which the new connection was initially detected by the control node, said data being maintained in memory for as long as the connection remains supported by resources in any one of the cells in the first set of cells.

3. A method according to claim 1, wherein said new connection is detected in response to either initial connection setup in a cell in the first set of cells or handover to a cell in the first set of cells from a cell under the control of a second control node.

4. A method according to claim 1, wherein said initial detection data include at least one of:

Public Land Mobile Network identity of the cell in which the new connection was detected;
identity of the cell in which the new connection was detected; and
identity of a core network node uniquely associated with the first Public Land Mobile Network to which the cell in which the new connection was detected belongs.

5. A method according to claim 1, wherein said determining is performed according to a predetermined rule which discriminates between connections whose initial detection data indicate the first Public Land Mobile Network and connections whose initial detection data indicate the second Public Land Mobile Network.

6. A method according claim 5, wherein said predetermined rule causes said determining to prioritize finding connections whose initial detection data indicate the second Public Land Mobile Network over connections whose initial detection data indicate the first Public Land Mobile Network.

7. A method according to claim 1, wherein ordering handover of said at least one of the one or more connections to said one or more cells in the second subset of cells is performed without prior notification to a core network node operably connected to the control node that it would be desirable to perform said handover.

8. A computer program embodied on a non-transitory computer-readable medium and executable by digital data processing circuitry to perform a method according to claim 1.

9. A method of handover control in a control node, said control node controlling allocation of radio resources in a first set of cells belonging to at least two different Public Land Mobile Networks, said first set of cells including at least a first subset of cells belonging to a first Public Land Mobile Network and a second subset of cells belonging to a second Public Land Mobile Network, wherein the method comprises:

detecting traffic load exceeding a predefined level in a first cell belonging to the first subset of cells;

determining, in response to said detecting the traffic load exceeding the predefined level in the first cell belonging to the first subset of cells, if there are one or more connections whose initial detection data indicated being in the second subset of cells belonging to the second Public Land Mobile Network, which could be supported by radio resources in one or more cells in the second subset of cells belonging to the second Public Land Mobile Network having capacity for handling additional traffic load to support the one or more connections in the first cell;

ordering, in response to the determining that there are one or more cells in the second subset of cells having capacity for handling additional traffic load, handover of at least one of said one or more connections to said one or more cells in the second subset of cells belonging to the second Public Land Mobile Network;

checking, if there are a second one or more connections whose initial detection data indicated being in the first subset of cells belonging to the first Public Land Mobile Network, and if there are radio resources in at least one cell, different from the first cell, of the first subset of cells belonging to the first Public Land Mobile Network to support the second one or more connections in the first cell; and responsive to the checking that there are radio resources in at least one cell of the first subset of cells belonging to the first Public Land Mobile Network to support the second one or more connections in the first cell, initiating a handover of at least one of the second one or more connections to a cell under the control of another control node, while indicating as a serving cell a cell belonging to the first Public Land Mobile Network indicated by an initial detection data associated with at least one of the second one or more connections whose radio coverage area essentially corresponds to the radio coverage area of the serving cell.

10. A control node that controls allocation of radio resources in a first set of cells belonging to at least two different Public Land Mobile Networks, said first set of cells including at least a first subset of cells belonging to a first Public Land Mobile Network and a second subset of cells belonging to a second Public Land Mobile Network, the control node comprising:

detecting circuitry that detects when traffic load exceeds a predefined level in a first cell belonging to the first subset of cells;

evaluating circuitry that determines, responsive to the traffic load exceeding the predefined level in the first cell belonging to the first subset of cells, if there are one or more connections whose initial detection data indicated being in the second subset of cells belonging to the second Public Land Mobile Network, which could be supported by radio resources in one or more cells in the second subset of cells belonging to the second Public Land Mobile Network having capacity for handling additional traffic load to support the one or more connections in the first cell; and handover circuitry that orders, in response to the determining that there are one or more cells in the second subset of cells having capacity for handling additional traffic load, handover of at least one of said one or more connections to said one or more cells in the second set of cells belonging to the second Public Land Mobile Network, wherein the evaluation circuitry further checks, if there are a second one or more connections whose initial detection data indicated being in the first subset of cells belonging to the first Public Land Mobile Network, and if there are radio resources in at least one cell, different from the first cell, of the first subset of cells belonging to the first Public Land Mobile Network to support the second one or more connections in the first cell, wherein the handover circuitry, responsive to the checking that there are radio resources in at least one cell of the first subset of cells belonging to the first Public Land Mobile Network to support the second one or more connections in the first cell, orders a handover of at least one of the second one or more connections to a cell in the first set of cells which belongs to the first Public Land Mobile Network.

11. A control node according to claim 10, the control node further comprising connection detection circuitry adapted to respond to detection of a new connection by registering in memory the initial detection data associated with the new connection and indicative of the Public Land Mobile Network to which the cell belongs in which a new connection was initially detected by the control node said data being maintained in memory for as long as the connection remains supported by resources in any one of the cells in the first set of cells.

12. A control node according to claim 11, wherein said new connection is detected in response to either initial connection setup in a cell in the first set of cells or handover to a cell in the first set of cells from a cell under the control of a second control node.

13. A control node according to any claim 11, wherein said initial detection data include at least one of:

Public Land Mobile Network identity of the cell in which the new connection was detected;

identity of the cell in which the new connection was detected; and identity of a core network node uniquely associated with the Public Land Mobile Network to which the cell in which the new connection was detected belongs.

14. A control node according to claim 11, wherein said evaluating circuitry is arranged for evaluating according to a predetermined rule which discriminates between connections whose initial detection data indicate the first Public Land Mobile Network and connections whose initial detection data indicate the second Public Land Mobile Network.

15. A control node according to claim 14, wherein said predetermined rule causes said evaluating circuitry to prioritize finding connections whose initial detection data indicate the second Public Land Mobile Network over connections whose initial detection data indicate the first Public Land Mobile Network.

16. A control node according to claim 10, wherein said handover circuitry is adapted to order handover of said at least one of the one or more connections to said one or more cells in the second subset of cells without prior notification to a core network node operable connected to the control node that it would be desirable to perform said handover.

17. A control node according to claim 10, wherein the evaluating circuitry is further arranged for evaluating in response to the traffic load exceeding the predefined level, connections in the first cell to find one or more connections which could be supported by radio resources in one or more other cells in the first subset of cells having capacity for handling additional traffic load, and the handover circuitry is further arranged for ordering handover of at least one of said one or more connections to said one or more other cells in the first subset of cells.

18. A control node that controls allocation of radio resources in a first set of cells belonging to at least two different Public Land Mobile Networks, said first set of cells including at least a first subset of cells belonging to a first Public Land Mobile Network and a second subset of cells belonging to a second Public Land Mobile Network, the control node comprising:
- detecting circuitry that detects when traffic load exceeds a predefined level in a first cell belonging to the first subset of cells;
- evaluating circuitry that determines, responsive to the traffic load exceeding the predefined level in the first cell belonging to the first subset of cells, if there are one or more connections whose initial detection data indicated being in the second subset of cells belonging to the second Public Land Mobile Network, which could be supported by radio resources in one or more cells in the second subset of cells belonging to the second Public Land Mobile Network having capacity for handling additional traffic load to support the one or more connections in the first cell; and
- handover circuitry that orders, in response to the determining that there are one or more cells in the second subset of cells having capacity for handling additional traffic load, handover of at least one of said one or more connections to said one or more cells in the second set of cells belonging to the second Public Land Mobile Network, wherein the evaluation circuitry further checks, if there are a second one or more connections whose initial detection data indicated being in the first subset of cells belonging to the first Public Land Mobile Network, and if there are radio resources in at least one cell, different from the first cell, of the first subset of cells belonging to the first Public Land Mobile Network to support the second one or more connections in the first cell, wherein the handover circuitry, responsive to the checking that there are radio resources in at least one cell of the first subset of cells belonging to the first Public Land Mobile Network to support the second one or more connections in the first cell, initiates a handover of at least one of the second one or more connections to a cell under the control of another control node, while indicating as a serving cell a cell belonging to the Public Land Mobile Network indicated by the initial detection data associated with at least one of the second one or more connections whose radio coverage area essentially corresponds to the radio coverage area of the serving cell.

* * * * *